United States Patent
Lin et al.

(10) Patent No.: US 8,665,010 B2
(45) Date of Patent: Mar. 4, 2014

(54) CIRCUIT AND METHOD FOR SUB-HARMONIC ELIMINATION OF A POWER CONVERTER

(75) Inventors: Kun-Yu Lin, Pingtung (TW); Pei-Lun Huang, Zhubei (TW)

(73) Assignee: Richpower Microelectronics Corporation, Grand Cayman (KY)

( * ) Notice: Subject to any disclaimer, the term of this patent is extended or adjusted under 35 U.S.C. 154(b) by 216 days.

(21) Appl. No.: 13/267,918

(22) Filed: Oct. 7, 2011

(65) Prior Publication Data

US 2012/0086480 A1   Apr. 12, 2012

(30) Foreign Application Priority Data

Oct. 12, 2010  (CN) .......................... 2010 1 0504206

(51) Int. Cl.
*H03B 1/00*  (2006.01)

(52) U.S. Cl.
USPC ........................................ 327/551

(58) Field of Classification Search
USPC ......................... 327/551, 142, 143
See application file for complete search history.

(56) References Cited

U.S. PATENT DOCUMENTS 8,183,898 B2 *  5/2012  Shin et al. ..................... 327/143
8,436,664 B2 *  5/2013  Wang et al. ................... 327/142

* cited by examiner

*Primary Examiner* — Hai L Nguyen
(74) *Attorney, Agent, or Firm* — Muncy, Geissler, Olds & Lowe, P.C.

(57) ABSTRACT

A circuit and method are provided for a power converter to select one from a plurality of current limit signals as a final current limit signal according to the present duty ratio of a power switch for the pulse width modulation of the next cycle, so that the duty ratio of the power switch in the next cycle is prevented from acute variation to eliminate sub-harmonic which otherwise may happen.

13 Claims, 7 Drawing Sheets

CIRCUIT AND METHOD FOR SUB-HARMONIC ELIMINATION OF A POWER CONVERTER

FIELD OF THE INVENTION

The present invention is related generally to a power converter and, more particularly, to a circuit and method for sub-harmonic elimination of a power converter.

BACKGROUND OF THE INVENTION

Figure 1:
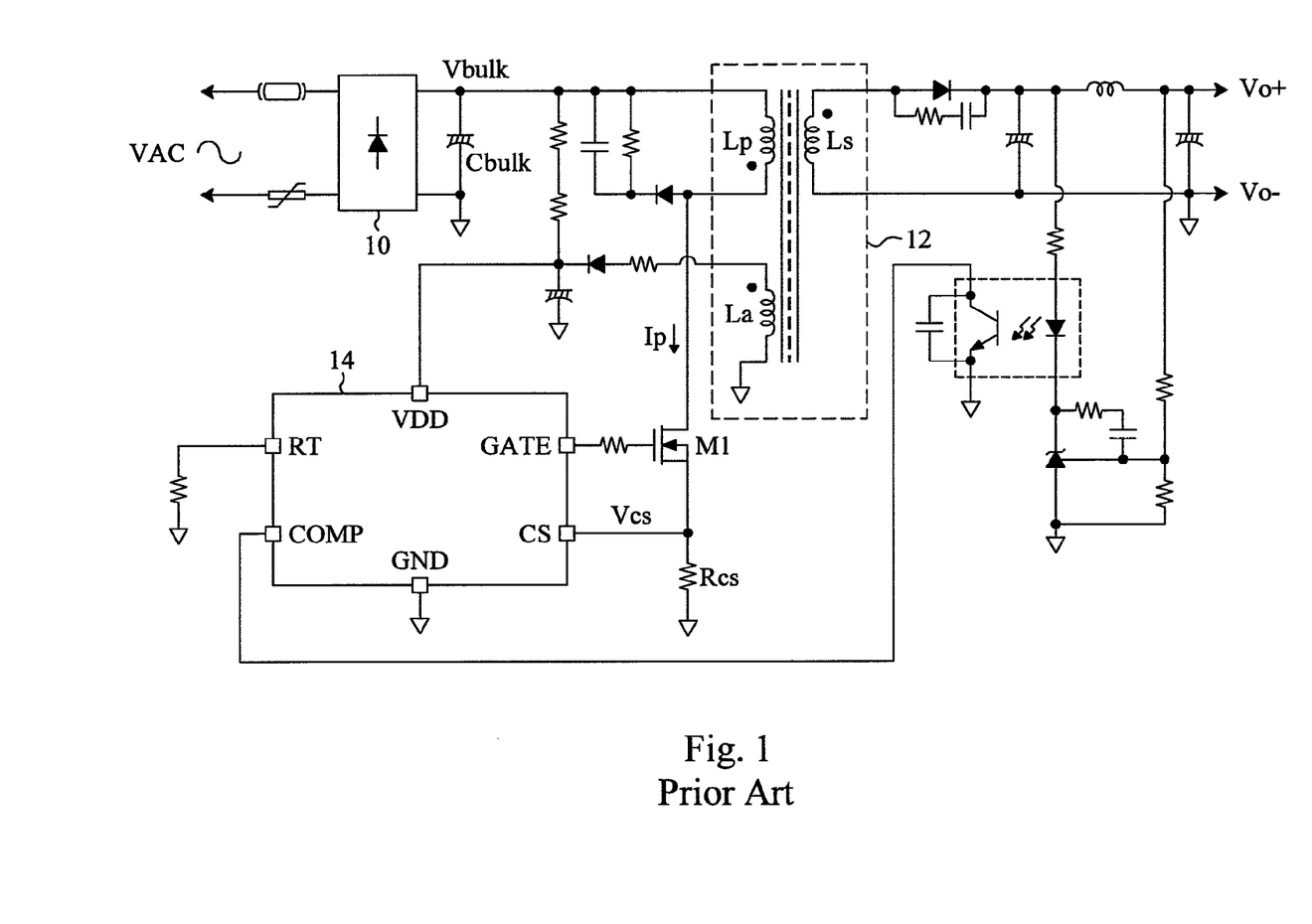
FIG. 1 is a circuit diagram of a typical flyback power converter.

Taking a typical flyback power converter for example, referring to FIG. 1, a rectifier circuit 10 is used to rectify an alternating-current (AC) input voltage VAC, a capacitor Cbulk is connected to the output of the rectifier circuit 10 to stabilize the direct-current (DC) input voltage Vbulk produced by the rectifier circuit 10 to apply to the primary coil Lp of a transformer 12, a controller 14 provides a control signal GATE to switch a power switch M1 connected in series with the primary coil Lp to convert the voltage Vbulk into a DC output voltage Vo, a current sense resistor Rcs is connected in series with the power switch M1 to produce a current sense signal Vcs related to the current Ip of the power switch M1, the controller 14 has a pin COMP receiving a feedback signal derived from the DC output voltage Vo for performing negative feedback control, and the controller 14 determines the control signal GATE according to the current sense signal Vcs and a preset current limit signal. Recently, for making products more competitive, lowering costs has become one of the requirements for product development, and therefore selection of components is increasingly strict while the capacitor Cbulk is increasingly downsized. However, for systems of a same rating, when having low input voltage, the system using a smaller capacitor Cbulk will have shorter hold up time for the voltage Vbulk, so the voltage Vbulk at the primary side of the transformer 12 varies significantly, which may cause serious sub-harmonic problem when the system escapes from soft-start or becomes overloaded. Such serious sub-harmonic problem may cause the system, when fully loaded, unable to start-up with a low input voltage or lead to a significant difference between a high input voltage over current protection and a low input voltage over current protection.

Figure 2:
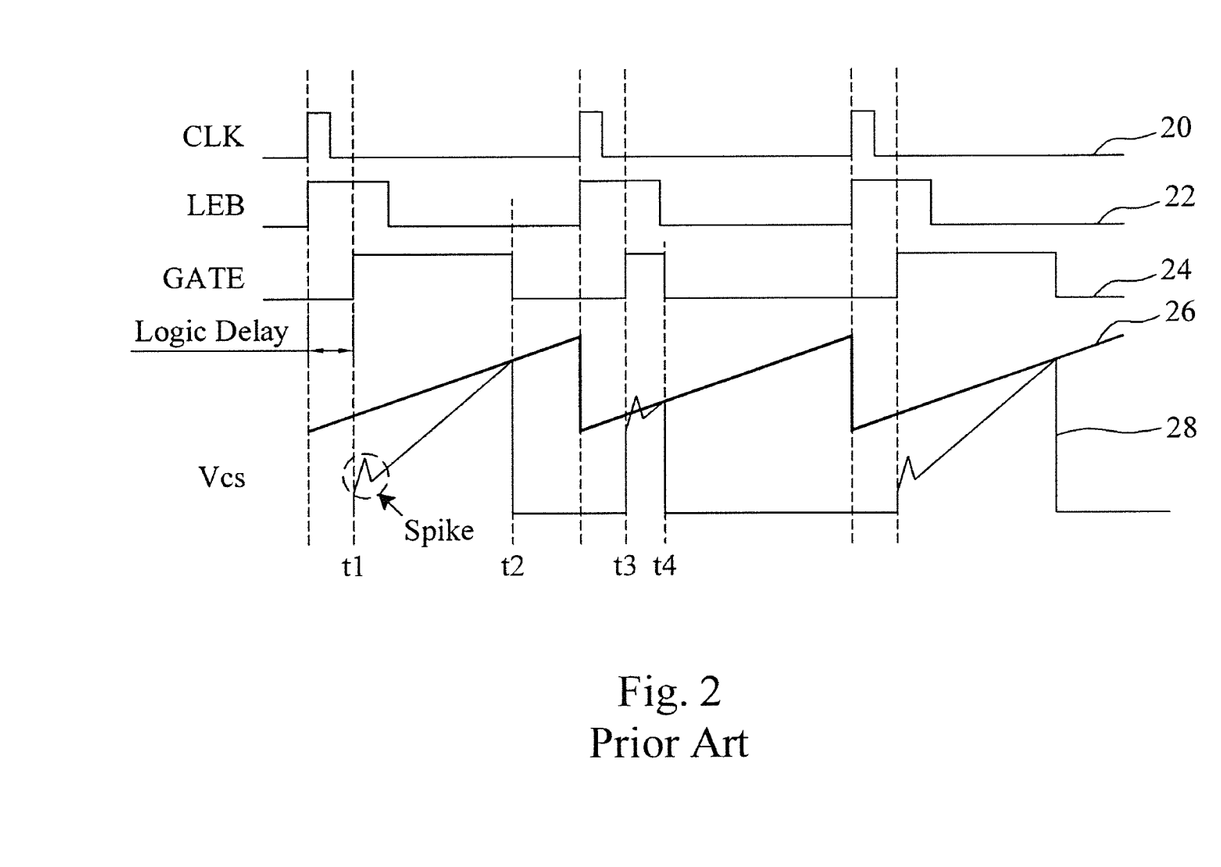
FIG. 2 is a waveform diagram of the flyback power converter shown in FIG. 1 to illustrate sub-harmonic problem thereof.

FIG. 2 illustrates the addressed sub-harmonic problem in the conventional flyback power converter, in which waveform 20 represents an internal clock CLK of the controller 14, waveform 22 represents a leading-edge blanking signal LEB, waveform 24 represents the control signal GATE, waveform 26 represents the current limit signal, and waveform 28 represents the current sense signal Vcs. The clock CLK serves to determine the cycle of the control signal GATE, the leading-edge blanking signal LEB is used to blank spikes of the current sense signal Vcs when the power switch M1 turns on, and the control signal GATE turns to low to turn off the power switch M1 once the current sense signal Vcs becomes higher than the current limit signal. Under a low input voltage, the power switch M1 has a longer on time, such as from time t1 to time t2, to obtain adequate energy, and thus has a shorter off time since the power switch M1 has a constant cycle, thereby causing incomplete release of energy. As a result, when the power switch M1 turns on again, as shown at time t3, the initial level of the current sense signal Vcs will be higher than the previous one, so the current sense signal Vcs will sooner become higher than the current limit signal, as shown at time t4, and the on time of the power switch M1 is shortened accordingly. The acute variation of the on time of the power switch M1 may cause serious sub-harmonic problem to the flyback power converter.

SUMMARY OF THE INVENTION

An objective of the present invention is to provide a circuit for sub-harmonic elimination of a power converter.

Another objective of the present invention is to provide a method for sub-harmonic elimination of a power converter.

According to the present invention, a circuit for sub-harmonic elimination of a power converter includes a current limit signal controller to generate a switch signal according to the duty ratio of a power switch, and responsive to the switch signal, a selector selecting a final current limit signal from two current limit signals provided by two current limit signal generators, to limit the maximum value of the current of the power switch. When the duty ratio is smaller than a preset threshold value, the selector selects one of the two current limit signals as the final current limit signal, and when the duty ratio is larger than the preset threshold value, the selector selects the other of the two current limit signals as the final current limit signal.

According to the present invention, a method for sub-harmonic elimination of a power converter includes the steps of providing two current limit signals, detecting the duty ratio of the power switch, selecting the first current limit signal as the final current limit signal to limit the maximum value of the current of the power switch when the duty ratio is not larger than a preset threshold value, and selecting the second current limit signal as the final current limit signal when the duty ratio is larger than the preset threshold value.

According to the present invention, a circuit for sub-harmonic elimination of a power converter includes a current limit signal controller to generate a switch signal according to the duty ratio of a power switch, and responsive to the switch signal, a selector selecting one from a plurality of current limit signals provided by a plurality of current limit signal generators as a final current limit signal to limit the maximum value of the current of the power switch. When the duty ratio is smaller than a preset threshold value, the selector selects a first one of the plurality of current limit signals as the final current limit signal, and when the duty ratio is larger than the threshold value, the selector selects one from the others of the plurality of current limit signals in an order as the final current limit signal, and if the others of the plurality of current limit signals are all selected once in the order, selects the first current limit signal again as the final current limit signal.

According to the present invention, a method for sub-harmonic elimination of a power converter includes the steps of providing a plurality of current limit signals, detecting the duty ratio of a power switch, remaining a first one of the plurality of current limit signals as a final current limit signal to limit the maximum value of the current of the power switch when the duty ratio is not larger than a preset threshold value, and when the duty ratio is larger than the preset threshold value, selecting one from the others of the plurality of current limit signals in an order as the final current limit signal, and if the others of the plurality of current limit signals are all selected once in the order, selecting the first current limit signal again as the final current limit signal.

By selecting the final current limit signal according to the duty ratio of the power switch, an appropriate final current limit signal may be selected for the next cycle once the duty ratio becomes excessively large, and thus the duty ratio is prevented from acute variation which otherwise causes sub-harmonic problem.

BRIEF DESCRIPTION OF THE DRAWINGS

These and other objectives, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 3:
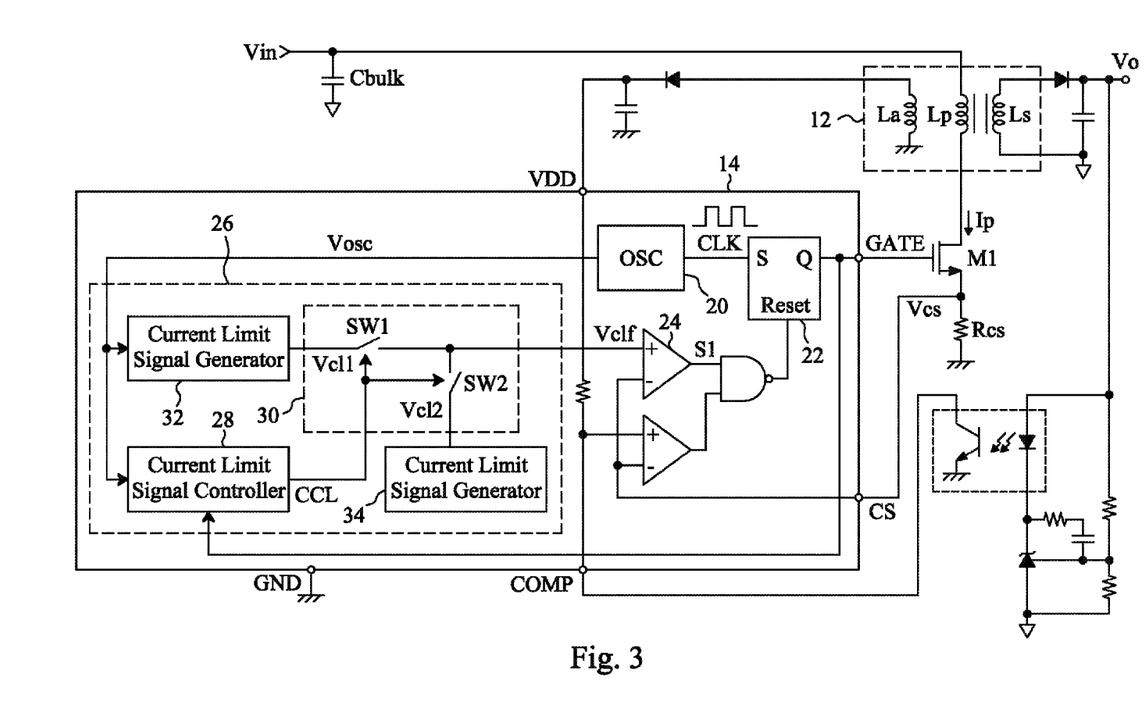
FIG. 3 is a circuit diagram of a flyback power converter according to the present invention.

Referring to FIG. 3, the same as that of FIG. 1, a flyback power converter includes the transformer 12, the power switch M1 connected in series with the primary coil Lp of the transformer 12, the current sense resistor Rcs connected in series with the power switch M1 to produce the current sense signal Vcs derived from the current Ip of the power switch M1, and the controller 14 to receive a feedback signal through the pin COMP for negative feedback control and provide the control signal GATE to switch the power switch M1 to convert the input DC voltage Vin into the output DC voltage Vo. According to the present invention, however, the controller 14 includes an oscillator 20 for providing a clock CLK and a ramp signal Vosc synchronous to the clock CLK, an SR flip-flop 22 for triggering the control signal GATE responsive to the clock CLK, a comparator 24 for generating a signal S1 to reset the SR flip-flop 22 according to the current sense signal Vcs and a final current limit signal Vclf, and a sub-harmonic eliminate circuit 26 for detecting the duty ratio of the control signal GATE and changing the final current limit signal Vclf according to the duty ratio of the control signal GATE. When the duty ratio of the control signal GATE is larger than a preset threshold value, the sub-harmonic eliminate circuit 26 changes the final current limit signal Vclf to prevent the duty ratio of the control signal GATE from acutely changing at the next cycle, thereby eliminating sub-harmonic which otherwise may happen.

The sub-harmonic eliminate circuit 26 includes a current limit signal controller 28, a selector 30 and two current limit signal generators 32 and 34 to provide a ramp current limit signal Vcl1 and a constant value current limit signal Vcl2 for the selector 30 to select therebetween under control of the current limit signal controller 28. Using a current limit signal generator to generate a ramp current limit signal is a prior art, for example, see U.S. Pat. No. 6,674,656, so the detailed explanation thereof is eliminated herein. The selector 30 includes a switch SW1 connected between the current limit signal generator 32 and the output terminal Vclf of the sub-harmonic eliminate circuit 26, and a switch SW2 connected between the current limit signal generator 34 and the output terminal Vclf of the sub-harmonic eliminate circuit 26. The current limit signal controller 28 detects the duty ratio of the control signal GATE to generate a switch signal CCL for controlling the switches SW1 and SW2, and thereby selecting the ramp current limit signal Vcl1 or the constant value current limit signal Vcl2 as the final current limit signal Vclf.

Figure 4:
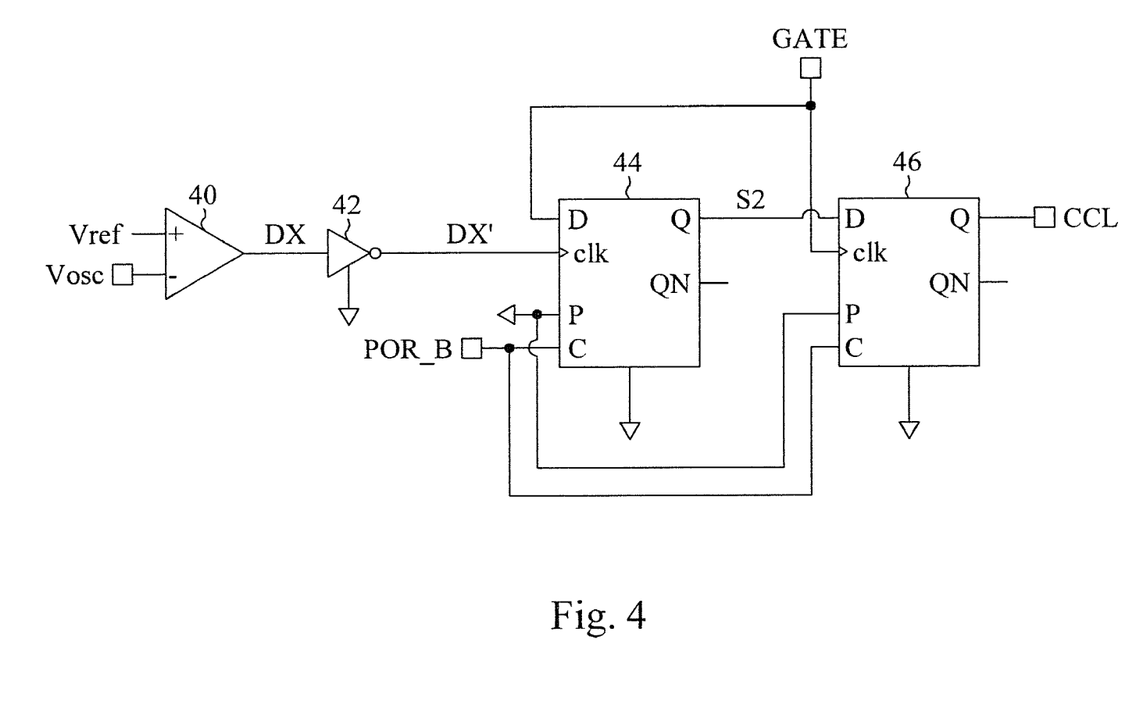
FIG. 4 is a circuit diagram of an embodiment for the current limit signal controller shown in FIG. 3.

FIG. 4 is a circuit diagram of an embodiment for the current limit signal controller 28, which includes a comparator 40 for comparing the ramp signal Vosc to a reference voltage Vref to generate a signal DX that has a constant duty ratio, an inverter 42 for inverting the signal DX to generate a signal DX', a D-type flip-flop 44 for generating a signal S2 according to the control signal GATE applied to its data input terminal D and the signal DX' applied to its clock terminal clk, and a D-type flip-flop 46 for generating the switch signal CCL according to the signal S2 applied to its data input terminal D and the control signal GATE applied to its clock terminal clk.

Figure 5:
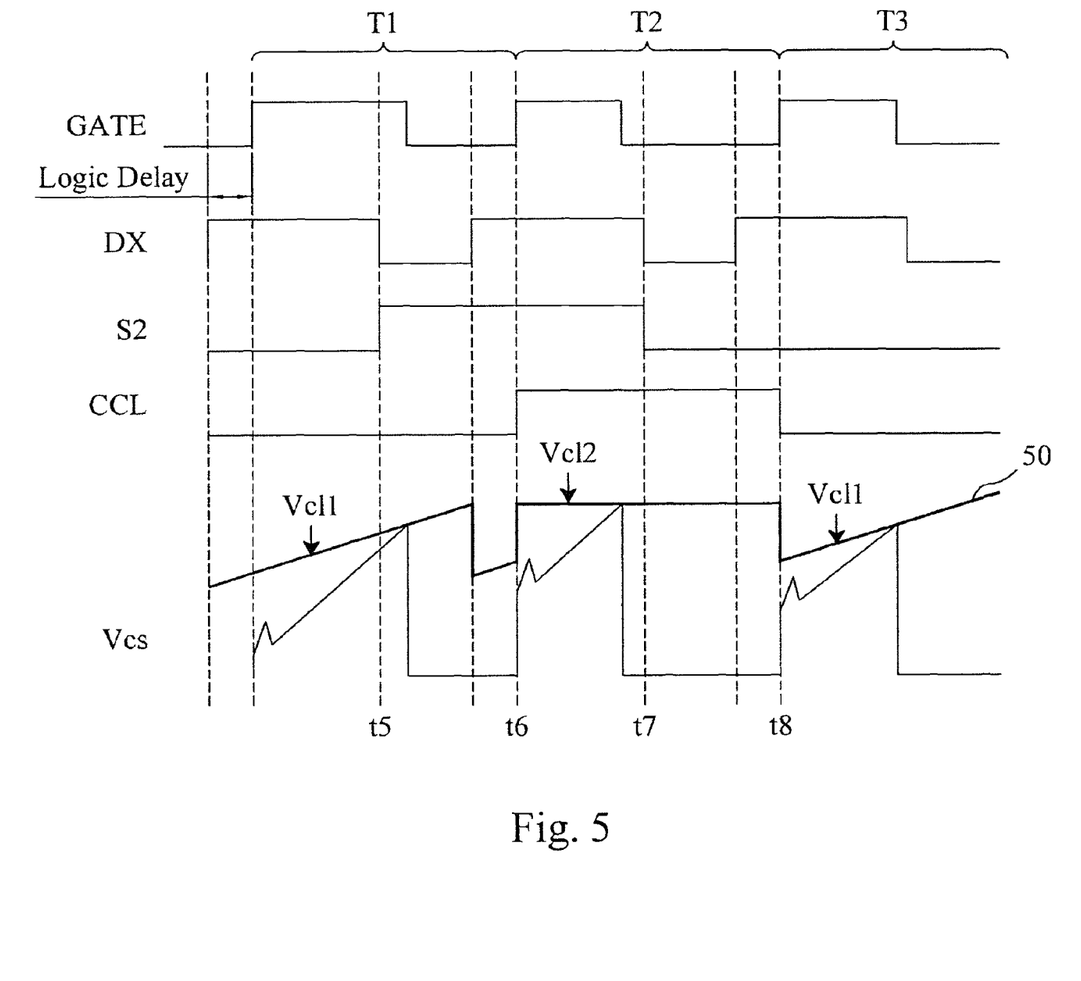
FIG. 5 is a waveform diagram of the flyback power converter shown in FIG. 3 using the current limit signal controller shown in FIG. 4.

FIG. 5 is a waveform diagram of the controller 14 using the circuit of FIG. 4 as the current limit signal controller 28, in which waveform 50 represents the final current limit signal Vclf. The ramp current limit signal Vcl1 is preset as the final current limit signal Vclf under normal operation. Referring to FIGS. 3-5, during a cycle T1, the duty ratio of the control signal GATE is larger than a preset threshold value, so when the signal DX turns to low, the control signal GATE still remains at high, as shown at time t5 of FIG. 5, and thus the D-type flip-flop 44 will remain the signal S2 at high. Then, during the next cycle T2, as shown at time t6 of FIG. 5, since the signal S2 is high when the control signal GATE turns to high, the D-type flip-flop 46 will pull the switch signal CCL to high and thus signal the selector 30 to select the current limit signal Vcl2 as the final current limit signal Vclf, as shown by waveform 50, which will prevent the on time of the power switch M1 from changing acutely, thereby eliminating sub-harmonic which otherwise may happen. Since the duty ratio of the control signal GATE in the cycle T2 is no longer larger than the preset threshold value, when the signal DX turns to low, as shown at time t7, the signal S2 will also turn to low, and thus, during the next cycle T3, when the control signal GATE turns to high, as shown at time t8, the switch signal CCL will turn to low and thus signal the selector 30 to select the current limit signal Vcl1 again as the final current limit signal Vclf. On the contrary, during the cycle T2, if the duty ratio of the control signal GATE remains larger than the preset threshold value, the selector 30 will remain the current limit signal Vcl2 as the final current limit signal Vclf. In other embodiments, the current limit signal Vcl1 may not be limited to have a ramp waveform, and the current limit signal Vcl2 may have another waveform instead of a constant value.

Alternatively, when detecting the duty ratio of the control signal GATE larger than the preset threshold value during the cycle T1, the sub-harmonic eliminate circuit 26 of FIG. 3 may select the current limit signal Vcl2 as the final current limit signal Vclf for the next cycle T2, and afterward, no matter whether the duty ratio of the control signal GATE is larger than the preset threshold value during the next cycle T2, the sub-harmonic eliminate circuit 26 will select the current limit signal Vcl1 again as the final current limit signal Vclf for the next cycle T3.

Figure 6:
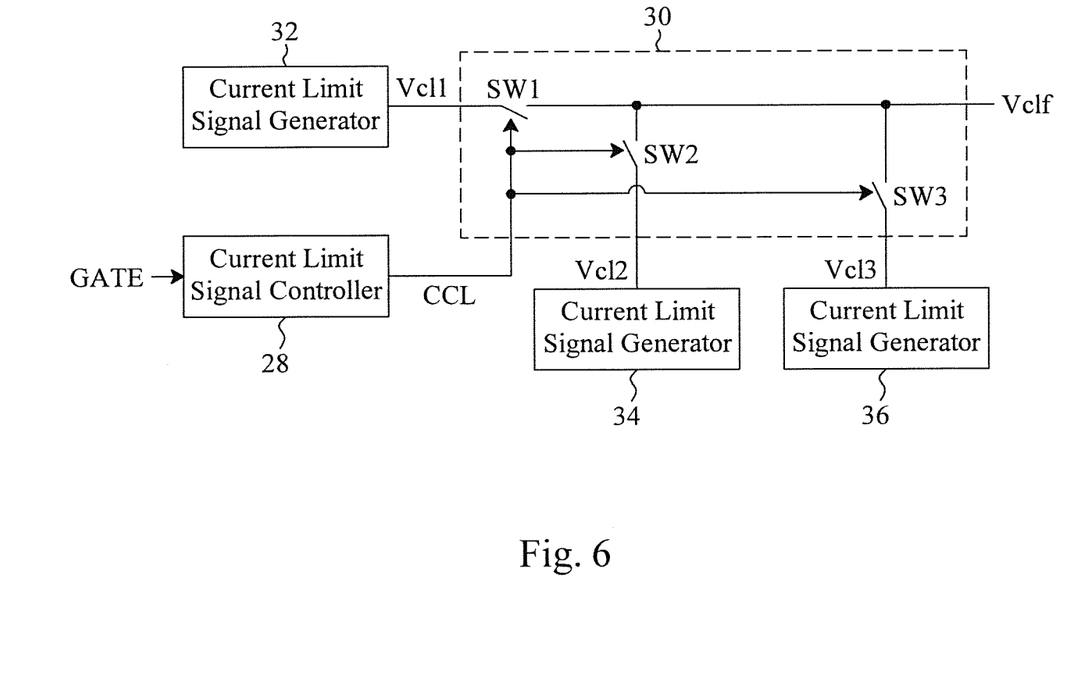
FIG. 6 is a circuit diagram of another embodiment according to the present invention.
Figure 7:
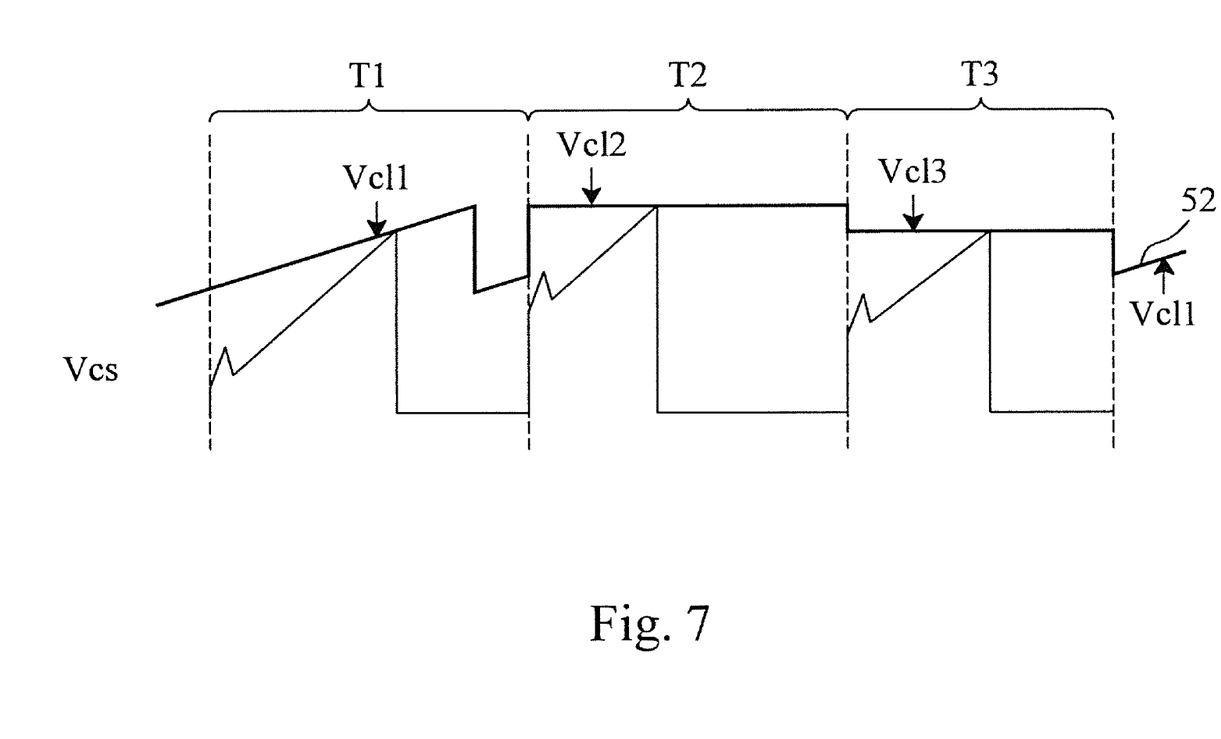
FIG. 7 is a waveform diagram of a flyback power converter using the circuit shown in FIG. 6.

FIG. 6 is a circuit diagram of another embodiment for the sub-harmonic eliminate circuit 26 of FIG. 3. In addition to the current limit signal controller 28, the selector 30 and the current limit signal generators 32 and 34 similar to those in the circuit of FIG. 3, there is further a current limit signal generator 36 for providing a constant value current limit signal Vcl3. Besides the switches SW1 and SW2, the selector 30 further has a switch SW3 connected between the current limit signal generator 36 and the output terminal Vclf of the sub-harmonic eliminate circuit 26. FIG. 7 is a waveform diagram of the circuit shown in FIG. 6, in which waveform 52 represents the final current limit signal Vclf. Referring to FIGS. 6 and 7, the current limit signal Vcl1 is preset as the final current limit signal Vclf under normal operation, and when the current limit signal controller 28 detects the duty ratio of the control signal GATE not larger than a preset threshold value, it will remain the final current limit signal Vclf=Vcl1. If the current limit signal controller 28 detects the duty ratio of the control signal GATE larger than the preset threshold value during the cycle T1, the current limit signal controller 28 will signal the selector 30 by the switch signal CCL to select the current limit signal Vcl2 as the final current limit signal Vclf for the next cycle T2, as shown by waveform 52. Then, no matter whether the control signal GATE is larger than the preset threshold value in the cycle T2, the selector 30 always selects the current limit signal Vcl3 as the final current limit signal Vclf for the next cycle T3. Similarly, no matter whether the control signal GATE is larger than the preset threshold value in the cycle T3, the selector 30 will select the current limit signal Vcl1 again as the final current limit signal Vclf for the next cycle. In other embodiments, the current limit signal Vcl1 may not be limited to have a ramp waveform, and the other current limit signals Vcl2 and Vcl3 may have other waveforms instead of constant values.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A circuit for sub-harmonic elimination of a power converter which determines a control signal for switching a power switch by comparing a final current limit signal to a current sense signal derived from a current of the power switch, the circuit comprising:
   a first current limit signal generator providing a first current limit signal;
   a second current limit signal generator providing a second current limit signal;
   a current limit signal controller operative to compare a reference voltage with a ramp signal for generating a signal having a constant duty ratio, detect a duty ratio of the control signal, and generate a switch signal according to the duty ratio of the control signal and the constant duty ratio; and
   a selector connected to the two current limit signal generators and the current limit signal controller, responsive to the switch signal to select one from the two current limit signals as the final current limit signal;
   wherein the selector selects the first current limit signal as the final current limit signal when the duty ratio of the control signal is smaller than the constant duty ratio, and selects the second current limit signal as the final current limit signal when the duty ratio of the control signal is larger than the constant duty ratio.

2. The circuit of claim 1, wherein the first current limit signal has a ramp waveform.

3. The circuit of claim 1, wherein the first current limit signal has a non-ramp waveform.

4. The circuit of claim 1, wherein the second current limit signal has a constant value.

5. The circuit of claim 1, wherein the second current limit signal has a non-constant value.

6. The circuit of claim 1, wherein the current limit signal controller comprises:
   an inverter inverting the signal having the constant duty ratio into a second signal;
   a first D-type flip-flop having a clock terminal receiving the second signal, and a data input terminal receiving the control signal, to determine a third signal accordingly; and
   a second D-type flip-flop having a clock terminal receiving the control signal, and a data input terminal receiving the third signal, to determine the switch signal accordingly.

7. A method for sub-harmonic elimination of a power converter which determines a control signal for switching a power switch by comparing a final current limit signal to a current sense signal derived from a current of the power switch, the method comprising the steps of:
   providing a first current limit signal and a second current limit signal;
   generating a signal having a constant duty ratio;
   detecting a duty ratio of the control signal;
   selecting the first current limit signal as the final current limit signal when the duty ratio of the control signal is not larger than the constant duty ratio; and
   selecting the second current limit signal as the final current limit signal when the duty ratio of the control signal is larger than the constant duty ratio.

8. The method of claim 7, wherein the first current limit signal has a ramp waveform.

9. The method of claim 7, wherein the first current limit signal has a non-ramp waveform.

10. The method of claim 7, wherein the second current limit signal has a constant value.

11. The method of claim 7, wherein the second current limit signal has a non-constant value.

12. A circuit for sub-harmonic elimination of a power converter which determines a control signal for switching a power switch by comparing a final current limit signal to a current sense signal derived from a current of the power switch, the circuit comprising:
   a plurality of current limit signal generators providing a plurality of current limit signals;
   a current limit signal controller operative to compare a reference voltage with a ramp signal for generating a signal having a constant duty ratio, detect a duty ratio of the control signal, and generate a switch signal according to the duty ratio of the control signal and the constant duty ratio; and
   a selector connected to the plurality of current limit signal generators and the current limit signal controller, responsive to the switch signal to select one from the plurality of current limit signals as the final current limit signal;
   wherein the selector selects a first one of the plurality of current limit signals as the final current limit signal when the duty ratio of the control signal is smaller than the constant duty ratio, and when the duty ratio of the control signal is larger than the constant duty ratio, the selector selects one of the others of the plurality of current limit signals in an order as the final current limit signal, and if the others of the plurality of current limit signals are all selected once in the order, selects the first current limit signal again as the final current limit signal.

13. A method for sub-harmonic elimination of a power converter which determines a control signal for switching a power switch by comparing a final current limit signal to a current sense signal derived from a current of the power switch, the method comprising the steps of:

(A) providing a plurality of current limit signals;
(B) generating a signal having a constant duty ratio;
(C) detecting a duty ratio of the control signal;
(D) remaining a first one of the plurality of current limit signals as the final current limit signal when the duty ratio of the control signal is not larger than the constant duty ratio;
(E) responsive to the duty ratio of the control signal larger than the constant duty ratio, selecting one of the others of the plurality of current limiting signals in an order as the final current limiting signal, and if the others of the plurality of current limiting signals are all selected once in the order as the final current limiting signal, selecting the first current limiting signal again as the final current limiting signal; and
(F) repeating the steps D and E.

* * * * *